Sept. 20, 1949.　　　　　J. H. KIEL　　　　　2,482,672
RECORDING AND PROJECTING APPARATUS
Filed March 3, 1945　　　　　　　　　　　　4 Sheets-Sheet 1

INVENTOR.
Julius H Kiel
BY
Cromwell, Greist + Warden
Attys.

Sept. 20, 1949.　　　　　　　　　J. H. KIEL　　　　　　　　2,482,672
RECORDING AND PROJECTING APPARATUS
Filed March 3, 1945　　　　　　　　　　　　　　　　4 Sheets-Sheet 2

INVENTOR.
Julius H. Kiel,
BY
Cromwell, Greist + Warden
Attys.

Sept. 20, 1949.  J. H. KIEL  2,482,672
RECORDING AND PROJECTING APPARATUS
Filed March 3, 1945  4 Sheets-Sheet 3

INVENTOR.
Julius H. Kiel,
BY
Cromwell, Greist + Warden
Attys

Sept. 20, 1949.  J. H. KIEL  2,482,672
RECORDING AND PROJECTING APPARATUS
Filed March 3, 1945  4 Sheets-Sheet 4
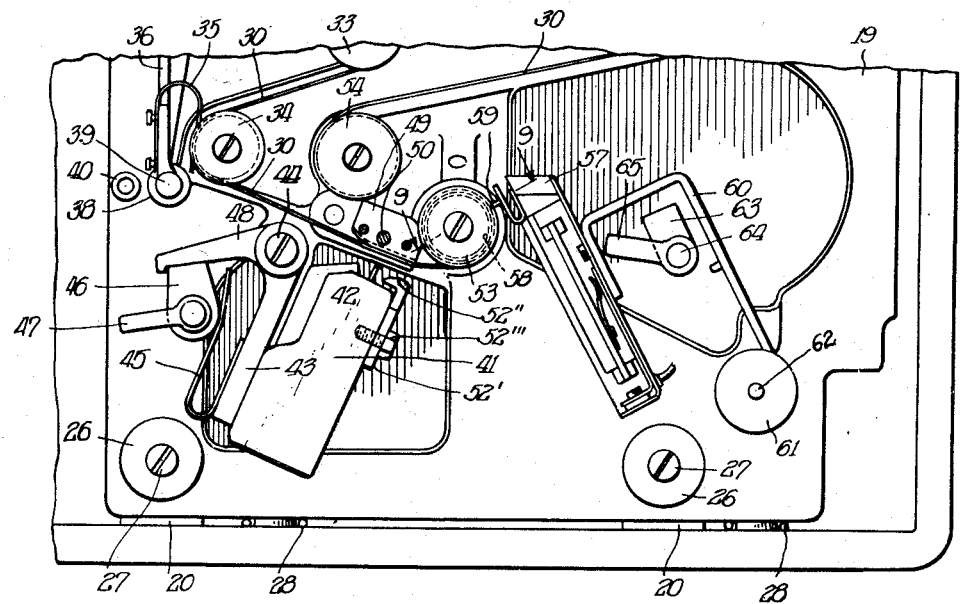
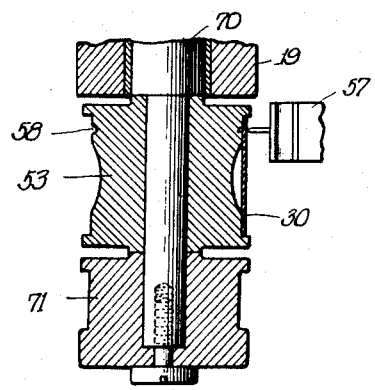
INVENTOR.
Julius H. Kiel.
BY
Cromwell, Greist + Warden
Attys Patented Sept. 20, 1949

2,482,672

UNITED STATES PATENT OFFICE 2,482,672

RECORDING AND PROJECTING APPARATUS

Julius H. Kiel, Wilmette, Ill.

Application March 3, 1945, Serial No. 580,897

6 Claims. (Cl. 88—16.2)

This invention relates to an improved apparatus for the selective recording of a sound track on a motion picture film and reproduction of sound effects from said track during subsequent projection of said film.

An object of the invention is to provide an apparatus of the type described which is particularly adapted for use in the home to make a sound recording track on an already developed and printed film while the latter is being projected, for proper synchronization of the sound with the picture action.

A further object is to provide a motion picture projector having in combination therewith a sound reproducing device and a sound recording instrumentality adapted to impress a sound track on a film by electromechanical means for subsequent coaction with said reproducing device in producing sound effects simultaneously with the projection of the motion picture.

A still further object is to provide a combined motion picture projection, sound recording and sound reproducing unit embodying a standard projector, in which the standard projector drive and existing means of the projector for feeding film are employed in advancing the film for the recording of a sound track thereon and reproduction of sound from such a track.

Yet another object is to provide a projecting, recording and reproducing device of the type described which is floatingly mounted in its entirety, in the interest of perfect operation of the respective instrumentalities for projecting, recording and reproducing.

A further object is to provide an apparatus of the type described incorporating an improved fly wheel arrangement and associated film feeding provisions for assuring an even and uninterrupted travel of the film past the sound recording and sound reproducing devices during the operation thereof.

A still further object is to provide a film feeding, sound recording, and reproducing apparatus of the type described adapted for use in association with practically all types of standard motion picture projecting machines.

In the drawings,

Fig. 8 is a fragmentary elevational view generally similar to Fig. 2, illustrating the sound recording and reproducing devices in another selective position thereof; and Fig. 9 is a fragmentary view in transverse vertical section on a line corresponding to line 9—9 of Fig. 8.

This invention pertains to a home motion picture projection apparatus; more particularly to such apparatus having incorporated as an integral and unitary part thereof devices for embossingly recording a sound track on a motion picture film being fed through said machine and for subsequently reproducing sound effects from said track. As such, the device can be used in the home to record desired sound effects on a predeveloped and printed film as the film images are being projected, and to immediately re-run and re-project the thus embossed film (without any processing) while simultaneously reproducing sound effects from the sound track, for the purpose of observing and checking the coordination of sound and visual image. Thereafter, of course, the embossed film is available for projection of sound movies as desired.

I am aware that it has heretofore been proposed to utilize devices for recording sound effects on a motion picture film in conjunction with an apparatus having provisions for reproducing the pictures and sound. However, such constructions are open to objection on several grounds, for example, some record the sound effects by photoelectric process, requiring the use of an undeveloped film which must subsequently be removed and processed by developing and printing prior to being capable of use in reproducing the sound effects. Other devices provide a separate sound recording and/or reproducing unit and separate driving and film feeding instrumentalities as an apparatus quite distinct from the projector itself. To my knowledge no one has provided an apparatus which functions as a companion unit with the motion picture projector, in which the film is fed past sound recording and/or reproducing devices by instrumentalities which are identical with those employed in advancing the film for visual projection, with or without sound. The present invention provides an apparatus which has these broad advantages, along with further more specific features of improvement to be hereinafter described in detail.

Figure 1:
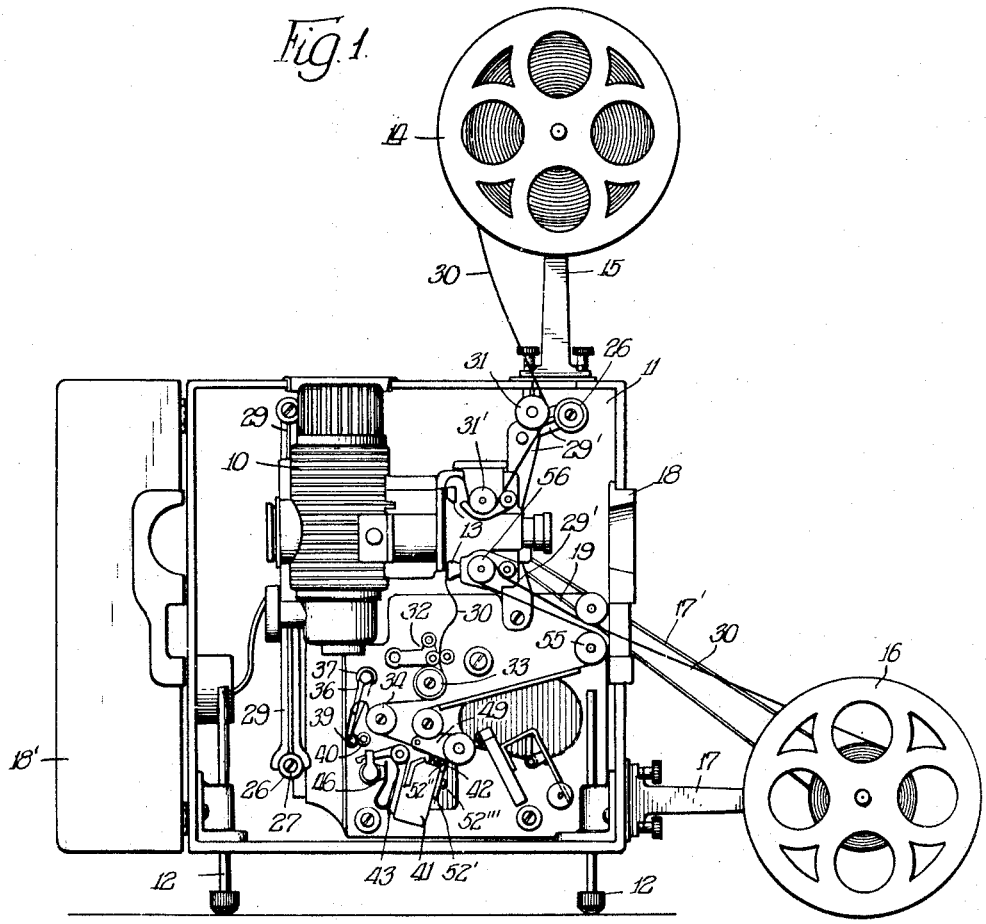
Fig. 1 is a view in side elevation, illustrating the apparatus of the present invention, incorporating a conventional motion picture projection device, with the casing of said apparatus opened to expose the assembly.
Figure 5:
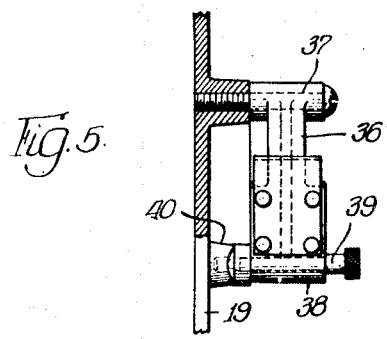
Fig. 5 is a fragmentary detail view partially in section, of a device for maintaining slight frictional drag on the film during feeding thereof.

Referring to the drawings, and in particular to Fig. 1, the reference numeral 10 generally designates a standard motion picture projector with which the apparatus of my invention is associated in combination. The structure of the present invention is so embodied as to be capable of minor modification for use with practically all types of home projectors, but that which I have chosen for purpose of illustration is recognizable as the well known Bell-Howell projector.

Housing this projector 10, and other instrumentalities to be described, is a portable casing 11 having adjustable supporting legs 12. The projector 10 located in the casing is in all respects of a conventional nature, having the usual devices, including an intermittent feed mechanism 13, for advancing a film therepast. These need not be described in detail. A supply reel 14 is carried by a removable pedestal 15 mounted on the top of casing 11 and a driven take-up reel 16 is similarly mounted on a bracket and pedestal 17 on the front of the casing. Reel 16 is driven by an endless spring drive belt 17' which extends through an opening in casing 11 and passes around a driven pulley on or in the projector. This pulley along with other parts of the projector, such as the intermittent feed device 13 and the shutter mechanism of the projector, is driven in a manner entirely conventional in projectors of this type by a suitable motor and interconnecting elements which are components of the projector. Such conventional structure is not illustrated in detail. The casing has a further front opening 18 through which the motion picture beam is projected; and a removable side cover 18' hinged on one edge of the casing enables ready access to the interior for film threading or any other manipulation called for in setting up or operating the apparatus.

The reference numeral 19 designates a vertically disposed mounting plate in the form of a generally flat casting which is carried internally of casing 11 and serves as a support for various devices to be described. This plate is mounted in a manner to eliminate or minimize to the greatest possible extent the projector motor vibration, jars, etc., such as would mar or detract from optimum conditions of recording and reproducing a sound track on a film fed through the apparatus.

Figure 4:
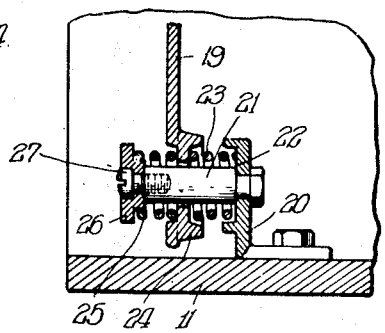
Fig. 4 is a fragmentary view in vertical transverse section on a line corresponding to line 4—4 of Fig. 2, illustrating details of the improved resilient floating mount of the projector and the support for other instrumentalities of the invention.
Figure 3:
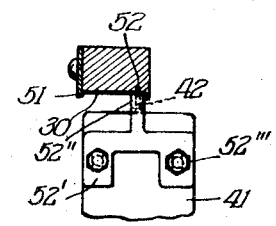
Fig. 3 is a fragmentary view in transverse vertical section on a line corresponding to line 3—3 of Fig. 2.

To this end, the casing 11 carries interiorly thereof approprlate brackets, exemplified by the L-shaped bracket 20 in Fig. 4, each of which has a laterally extending post 21 fixed thereon concentrically with a circular hollow seat 22 in the bracket. This seat receives a coil spring 23 which encircles the post and abuts a similar seat 24 on the supporting plate 19. The plate 19 is resiliently urged against spring 23 by a coil spring 25 on the opposite side thereof and an end thrust cap 26 held in place on the post by a screw 27. This type of mounting is employed at three locations, as illustrated in Figs. 1 and 2, to maintain a resilient, lateral and vertical floating mounting for supporting plate 19 and the devices thereon.

The above provision affords a mount for the film guiding, recording and reproducing devices to be described which is full-floating and entirely absorbs shock and vibration such as would detract from the operation of the apparatus by the introduction of extraneous vibrations into the recording and reproducing cycles. To the same end of absorbing and damping vibrations, the projector 10 is carried by brackets 29, 29' (see Fig. 1) which are floatingly mounted by spring supports such as I have described to the rear wall of casing 11. In order to further support the relatively heavy projector 10 for full floating action, I provide similar spring supports 28 on the floor of the casing.

Figure 2:
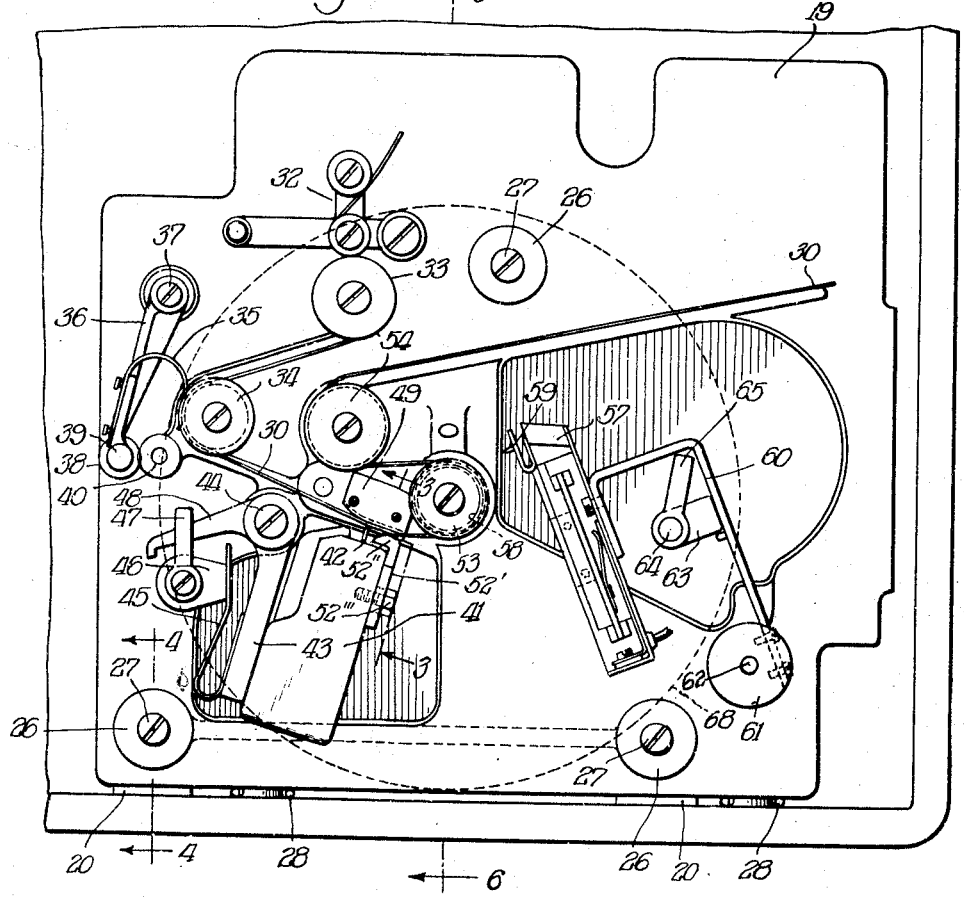
Fig. 2 is a fragmentary enlarged view in side elevation, more particularly illustrating the film feeding, sound recording and sound reproducing instrumentalities of the present invention.

Referring to Figs. 1 and 2, the developed and printed film 30, ordinarly a standard 16 mm. film, is fed downwardly from supply reel 14 past an idler roller 31 suitably journaled on casing 11 by an upper feed sprocket 31' on the projector, to the existing intermittent feed device 13 of the projector. Leaving device 13 the film next traverses a guide device 32 and an idler 33, both on plate 19.

After leaving the projector 10 and the intermittent feed device 13, the further feed of the film 30 is provided by the lower feed sprocket 56 on projector 10. It is essential that a certain amount of slack be provided to form a loop in the film in order to provide a filter for the intermittent movement of the film as it leaves intermittent feed device 13.

The reference numeral 34 designates an idler to which the film passes from idler 33, and with which the means for securing tension or tautness coacts. This tension is essential for the proper guidance and reaction of the film as it passes further instrumentalities to be described. Idler 34 has associated with it a spring device selectively engageable with the film to maintain a slight frictional drag thereon. This device comprises a bent leaf friction spring 35 engageable with the film and secured to an arm 36 which is pivoted on supporting plate 19 at 37. At its free end 38 arm 36 is provided with a manually retractable pin 39 and the plate 19 has a pair of bosses 40 spaced from one another on the arc of movement of pin 39 and each recessed for the selective reception of said pin. Accordingly, the arm 36 may be located in one of two positions, either the recording position illustrated in Figs. 1 and 2 in which the spring 35 engages and exerts a slight frictional drag on the film, or in the playback position of Fig. 8 in which it engages and exerts a relatively large frictional drag on the film. To facilitate threading of the film through the machine, the pin is disengaged from bosses 40 and swung out of the way. This spring retarding device exerts just sufficient frictional load on the film to insure the drawing, without slipping, of the sound take-off idler 53, to be referred to. The object of the two positions of arm 36 is to provide two degrees of load to compensate for the variations in load during the recording and playback operations.

Leaving idler 34, the film next passes over an anvil 49 and at this point is engaged adjacent one side edge thereof by a sound recording head which I have generally designated by the reference numeral 41. This device may be a conventional crystal or electromagnetic type, carrying a laterally vibratory film embossing stylus 42, it being understood that a sound or voice modulated current transmitted to the head through an appropriate lead is converted by means in the head to mechanical vibration of stylus 42, which in turn produce a continuous embossed track on the film. I have not considered it necessary to illustrate in detail the provisions for effecting this electromechanical conversion, inasmuch as recording devices of the type in question, just as the reproducing pick-up to be hereinafter referred to, are known in the art.

Recording head 41 is mounted on an arm 43 which is pivoted on plate 19 by a post 44. Arm 43 is angularly shiftable and laterally adjustable on the post to the end that the recording head 41 may be accurately positioned with reference to the anvil 49 referred to. The weight of the head normally tends to disengage the stylus 42 from the film, hence the stylus is maintained in engaged position by a bent spring 45 on the rear side of arm 43 which is engaged by a manually releasable cam member 46. This cam member is journaled on the supporting plate and has secured thereto a finger piece 47 adapted to be manipulated to rotate the cam and accordingly engage or disengage the recording head in a manner which will be obvious. A stop member 48 integral with arm 43 serves to limit the counterclockwise rotation of the cam 46 and prevent undesired engagement of the recording stylus 42 with anvil 49 when the recording head is in inoperative position.

For coaction with the stylus 42 on the side of film 28 opposite said stylus, I provide the above referred to fixed anvil or platen member 49 supported on plate 19. This anvil has fixed and resiliently yieldable lateral film guide shoulders 50, 51 respectively, and since the width of the anvil between said shoulders is less than the width of the film, shoulder 51 will yield laterally while applying side pressure to the film to maintain the same against the fixed shoulder 50 in proper register for action of the recording stylus 42 thereon, preventing lateral displacement of the film 30 therefrom. Adjacent the fixed shoulder 50 of the anvil 49 the latter is provided with a small longitudinal groove 52, the film spanning said groove as it is fed over the anvil. A recording depth gauge 52' is adjustably mounted on recording head 41, this gauge being provided with a rounded film-engaging shoe 52" which rides on the film in advance of stylus 42 as it passes beneath anvil 49. Hence, regardless of variations in thickness of the film (which may be considerable in some types), the stylus 42 will make a recording impression of uniform depth. Adjustment of the shoe may be accomplished in any desired manner, as by the securing screws 52''' passing through vertical slots in the gauge 52' and threadedly engaging head 41. Said head is laterally adjustable in the manner referred to above to bring stylus 42 in accurate lateral register with the mid point of groove 52 for the recording operation.

I have found that the dimension of groove 52 is critical for best recording of a sound track, inasmuch as the action of stylus 42 is an embossing or indenting action rather than an excising or truly cutting action. If the groove is too wide, sharpness of impression is lost, and if it is too narrow, the stylus tends to cut or tear the film. I have found that the width of the groove 52 should not exceed .012 inch when a stylus 42 of best embossing qualities is employed. Naturally, the character of the stylus itself and pressure thereon bear in considerable degree on the desirable width of groove 52; however, for the most advantageous conditions the dimension set forth above holds good. It should be understood, however, that except as limited by the appended claims, I do not restrict myself to any particular type of indenting, engraving or embossing for the production of the sound track.

As stated and as will be understood by those skilled in the art, the recording head 41 has a sound or voice modulated current applied thereto, originating in a microphone and appropriately amplified or otherwise controlled between the microphone and head. Details of the microphone-to-recording head circuit are not illustrated and described herein, in view of the fact that appropriate provisions of this character are well known in the art. However, I contemplate provision of a suitable control and plug-in panel (not shown) into which the connector jack of a microphone lead may be plugged, said panel having associated standard selective amplifying and tone control circuits, along with plug-in loud speaker connections for use when the sound reproducer is in operation. The present invention, however, pertains exclusively to the assemblage by which the film is fed, acted on and subsequently employed in the recording and reproduction of those sound effects. To these ends a microphone speaker and connecting instrumentalities are necessary adjuncts, but conventional hookups of the necessary type abound, hence no need for illustration herein is believed to exist.

By the above provisions a continuous sound track is impressed or indented in film 30 as the same passes between anvil 49 and stylus 42. From the practical consideration of minimizing possibility of damage to the film, I prefer that the groove 52 and stylus 42 be located so that the track is produced inwardly about .015"–.020" from the inside edge of the usual feed perforations along a side of the film. This may bring the sound track slightly within the picture area, hence it becomes necessary to mask the picture projection area of the projector 10 a slight amount in order that the track will not be visible on the screen during projection. Of course, this laterally reduces the picture area on the screen somewhat, but by no means sufficiently to throw the image out of proportion or to constitute a noticeable objection, as will be appreciated.

After it leaves the recording stylus, the film passes around idlers 53 and 54, journaled in plate 19, thence around idler 55, also rotatable on the supporting plate, and lower feed sprocket 56 on the projector to the reel 16. Idler 53 serves as a rotary platen or support member for the film during the times that it is operated on by the sound reproducing head or pick-up 57, to be hereinafter further referred to. In order to accommodate the raised ridge on the reverse side of the film, produced by the embossing recording operations, idler 53 is provided with a peripheral groove 58 in lateral registry with the embossed track or groove in the film. The groove 58 also serves to accommodate dirt and dust which may accumulate in operation, thereby eliminating the possibility of bumps occurring during the reproducing cycle.

Said groove on roller 53 is in lateral alignment with the groove 52 of the recording anvil 49, so that the film may be run through the apparatus for recording with the parts in the position shown in Fig. 2, then returned to reel 14, rethreaded in the apparatus with the recording and reproducing heads and friction spring 45 in withdrawn position, and re-run with the recording device retracted and the reproducing pick-up engaged, as illustrated in Fig. 8, to audition the results of the recording.

Pick-up 57 is carried by one extremity of a pivoted bent arm 60 which is secured at its opposite end to a collar 61. This collar is angularly shiftable and laterally adjustable on a post 62 carried by the supporting plate 19, to the end that the pick-up may be properly positioned laterally of the film for proper coaction with the sound track on the latter. A manually actuable cam 63 pivoted on the plate 19 at 64 engages the supporting arm 60 for the pick-up to enable the latter to be thrown to inoperative positions, as illustrated in Fig 2, or placed in the operative position illustrated in Fig. 8. A manually operable finger piece 65 on cam 63 enables this manipulation to be conveniently accomplished.

As will be apparent to those versed in the art, the needle 59 of pick-up 57 is vibrated by sound track, the pick-up converting these mechanical vibrations to a modulated electrical current. This current is appropriately amplified or otherwise controlled and fed to a loud speaker; as hereinbefore pointed out, structural details and operation of this equipment are well understood, and hence are not enlarged on here.

Figure 6:
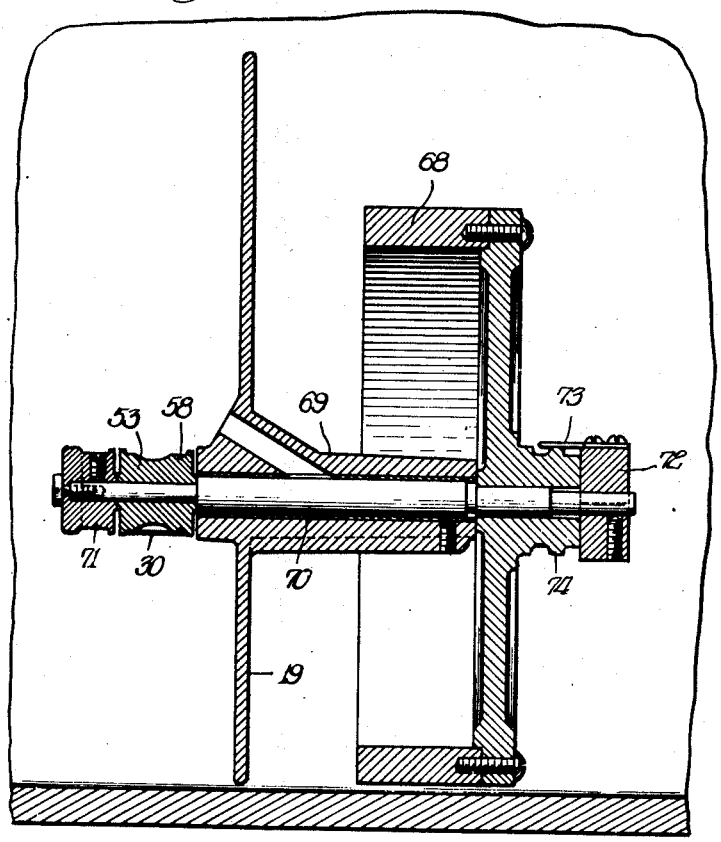
Fig. 6 is a fragmentary view in transverse vertical section on a line corresponding to line 6—6 of Fig. 2, illustrating an improved type of fly wheel for assuring smooth and uninterrupted feed of the film.
Figure 7:
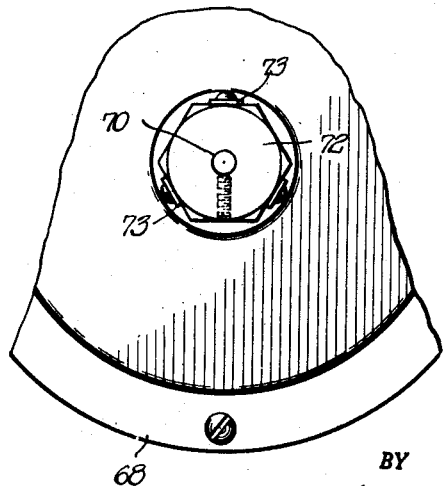
Fig. 7 is a fragmentary view in end elevation, further illustrating details of said fly wheel arrangement.

In the functioning of the above described recording and reproducing instrumentalities it is essential that the feed of the film be uniform and smooth, and free from the intermittent characteristics of the conventional step-by-step projector feed device 13. To this end, I provide a fly wheel 68 of substantial mass for the idler roller 53 serving as a rotary support for the film at the pick-up location (see Fig. 6). As illustrated in that figure, plate 19 is provided with an elongated boss 69 normal to and extending rearwardly of plate 19. Boss 69 is axially bored and provided with bearing means for the rotatable mounting of a shaft 70 to which roller 53 is secured. A clutch member 71, on the front side of plate 19, secured to the shaft by a set screw and drivingly engaging roller 53, serves to couple said roller for rotation with the shaft. On the opposite or rear side of the plate 19 the fly wheel 68 is rotatably mounted on a reduced diameter extension of shaft 70.

Were the fly wheel rigidly secured to the shaft for rotation with idler roller 53, there would be a likelihood of tearing the film in event of sudden starting of the feed thereof past the idler. I therefore prefer that the fly wheel be secured for rotation with the idler roller in an impositive and frictional manner, and to this end I provide a collar 72 secured by a set screw to the shaft and having a plurality of flat leaf spring members 73 projecting parallel to the fly wheel axis and frictionally engaging a circumferential rib 74 on the hub of the fly wheel. This provides sufficient frictional engagement to enable rotation of the fly wheel with the idler roller 53, but relative rotation of the fly wheel is permitted in the event of abrupt starting of the film feed. The sudden stopping of film movement loosens the snubbing action around idler 53, thereby decreasing frictional coaction between these elements and allowing the idler to spin without feeding the film.

The foregoing apparatus provides an entirely self-contained and unitary sound motion picture recording, projecting and reproducing unit for home use. An already developed motion picture film may be set up on the supply reel, run through the projector to project the same on the screen and, with the recording head in operative position, any oral account or description or any sound effects which are desired can be added to the film in the form of an embossed sound track. When this operation is completed the same may be re-run in the space of a few moments time to observe and check accuracy, timing or coordination of the sound effects. This apparatus requires nothing in the way of additional driving means for the recording or reproducing cycles, and no special feeding devices other than elements corresponding to those on a conventional projector. It manifestly constitutes a distinct improvement over systems in which a photo-electric sound recording procedure is employed, since it is unnecessary to process any intervening steps such as developing, printing, etc., between the actual recording and reproducing. Using the apparatus herein described, motion pictures which were filmed years ago may be brought up to date by application in a single operation of any desired sound effects thereon.

Furthermore, the device, being self-contained in its entirety, is readily transported and set up. The supporting plate 19 and projector sustaining brackets 29, 29' are capable of ready modification to practically all existing commercial motion picture projectors; and the 100% floating mount of the projector and associated instrumentalities assures absolutely optimum conditions for both the recording and reproducing phases of operation.

I claim:

1. A sound motion picture projecting, recording and reproducing apparatus, comprising a projector adapted to project visual images from a traveling developed film strip, said projector including driven feed means for advancing the strip for projecting, recording or reproducing, a sound recording device adjacent the path of travel of said strip, comprising a recording head having a vibratory stylus engageable with said film strip adjacent the side edge thereof as the same is advanced by said feed means in order to produce a continuous sound track therein, said head including means for imparting modulated vibration to said stylus during the engagement thereof with the strip to mechanically produce said sound track by indenting said strip in response to a sound modulated current applied to said head, and a sound reproducing device adjacent said path of travel and spaced from said recording device longitudinally of said path, comprising a pick-up having a stylus engageable in the sound track on a strip produced by said recording device and means to convert vibration of said pick-up stylus resulting from said last named engagement to a modulated current, said recording and reproducing devices being selectively engageable with said strip simultaneously with the projection of images by said projector, and as the strip is advanced past the selected device by the feed means of the projector.

2. A sound motion picture projecting, recording and reproducing apparatus, comprising a projector adapted to project visual images from a traveling developed film strip, said projector including driven feed means for advancing the strip for projecting, recording or reproducing, a sound recording device adjacent the path of travel of said strip, comprising a recording head having a vibratory stylus engageable with said film strip as the same is advanced by said feed means in order to produce a continuous sound track therein, said head including means for imparting modulated vibration to said stylus during the engagement thereof with the strip to mechanically produce said sound track by indenting said strip in response to a sound modulated current applied to said head, a sound reproducing device adjacent said path of travel and spaced from said recording device longitudinally of said path, comprising a pick-up having a stylus engageable in the sound track on a strip produced by said recording device and means to convert vibration of said pick-up stylus resulting from said last named engagement to a modulated current, said recording and reproducing devices being selectively engageable with said strip simultaneously with the projection of images by said projector, and as the strip is advanced past the selected device by the feed means of the projector, and manually operable means for selectively engaging said styli with said film strip as desired.

3. A sound motion picture projecting, recording and reproducing apparatus, comprising a projector adapted to project visual images from a traveling developed film strip, said projector including driven feed means for advancing the strip for projecting, recording or reproducing, a sound recording device adjacent the path of travel of said strip, comprising a recording head having a vibratory stylus engageable with said film strip to mechanically produce a permanent sound track therein as the same is advanced by said feed means, said head including means for imparting modulated vibration to said stylus during the engagement thereof with the strip in response to a sound modulated current applied to said head, a fixed anvil member on the side of the film strip opposite said stylus, over which the strip is guided and supported for engagement by the latter said member having a longitudinally extending groove on the strip supporting surface thereof with which said stylus is in transverse register, to indent a sound track in the strip without cutting the latter, and a sound reproducing device adjacent said path of travel and spaced from said recording device longitudinally of said path, comprising a pick-up having a stylus engageable in the sound track on a strip produced by said recording device and means to convert vibration of said pick-up stylus resulting from said last named engagement to a modulated current, said recording and reproducing devices being selectively engageable with said strip simultaneously with the projection of images by said projector, and as the strip is advanced past the selected device by the feed means of the projector.

4. A sound motion picture projecting, recording and reproducing apparatus of the type described for developed film strips, comprising a projector having means for feeding a film strip and adapted to project visual images therefrom, a sound recording device adjacent the path of feed of the strip, said device including a recording head having a vibratory stylus directly engageable with said film strip as the same is fed and means for imparting modulated vibration to said stylus in response to a sound modulated current applied to said head to thereby indent said strip to produce a continuous modulated sound track in said strip, and a sound reproducing device adjacent the path of feed of the strip and spaced from said recording device longitudinally of said path, said reproducing device including a pick-up having a stylus engageable with a sound track in the strip and means actuated by said pick-up stylus to convert vibration thereof to an electric current, said styli being in lateral register with one another with reference to the path of feed of the strip and being selectively engageable with the latter as it is fed past the selected device by said projector feed means during the projection of images from the strip by said projector.

5. A sound motion picture projecting, recording and reproducing apparatus of the type described, comprising a projector having means for feeding a film strip and adapted to project visual images therefrom, a sound recording device adjacent the path of feed of the strip, said device including a recording head having a vibratory stylus directly engageable with said film strip as the same is fed and means for imparting modulated vibration to said stylus in response to a sound modulated current applied to said head to thereby produce a continuous modulated sound track in said strip, a sound reproducing device adjacent the path of feed of the strip, said reproducing device including a pick-up having a stylus engageable with a sound track in the strip and means actuated by said pick-up stylus to convert vibration thereof to an electric current, said styli being in lateral register with and longitudinally spaced relation to one another with reference to the path of feed of the strip and being selectively engageable with the latter as it is fed past the selected device by said projector feed means during the projection of images from the strip by said projector, and a casing housing and supporting said projector and devices therein as a self-contained unit.

6. A sound motion picture projecting, recording and reproducing apparatus of the type described, comprising a projector having means for feeding a film strip and adapted to project visual images therefrom, a sound recording device adjacent the path of feed of the strip, said device including a recording head having a vibratory stylus engageable with said film strip as the same is fed and means for imparting modulated vibration to said stylus in response to a sound modulated current applied to said head to thereby mechanically produce a continuous modulated sound track in said strip, a sound reproducing device adjacent the path of feed of the strip, said reproducing device including a pick-up having a stylus engageable with a sound track in the strip and means actuated by said pick-up stylus to convert vibration thereof to an electric current, said styli being in lateral register with and longitudinally spaced relation to one another with reference to the path of feed of the strip and being selectively engageable with the latter as it is fed past the selected device by said projector feed means during the projection of images from the strip by said projector, and a casing housing and supporting said projector and devices therein as a self-contained unit, said casing having means for resiliently suppotring said projector and devices to minimize transmission of vibration therebetween.

JULIUS H. KIEL.

(References on following page)

REFERENCES CITED

The following references are of record in the file of this patent:

UNITED STATES PATENTS

| Number | Name | Date |
|---|---|---|
| 1,589,139 | Foley | June 15, 1926 |
| 1,925,600 | Owens | Sept. 5, 1933 |
| 1,971,446 | Goldsmith | Aug. 28, 1934 |
| 1,999,754 | Evans | Apr. 30, 1935 |
| 2,064,049 | Wurm et al. | Dec. 15, 1936 |
| 2,066,041 | Kiel | Dec. 29, 1936 |
| 2,087,135 | Wielage | July 13, 1937 |
| 2,099,376 | Shapiro | Nov. 16, 1937 |
| 2,105,741 | Kuhlik | Jan. 18, 1938 |
| 2,167,817 | Smith | Aug. 1, 1939 |
| 2,183,117 | Daniel | Dec. 12, 1939 |
| 2,288,983 | Weiss | July 7, 1942 |
| 2,323,215 | Gilman et al. | June 29, 1943 |
| 2,328,597 | Woolf | Sept. 7, 1943 |
| 2,369,786 | Kuhlik | Feb. 20, 1945 |

FOREIGN PATENTS

| Number | Country | Date |
|---|---|---|
| 463,308 | Great Britain | Mar. 23, 1937 |